Nov. 12, 1935.                B. ASNES                 2,020,928
                        LAMINATED SHEET MATERIAL
                         Filed Oct. 20, 1934          2 Sheets-Sheet 1
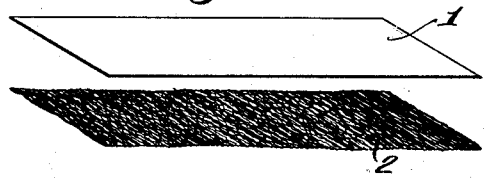
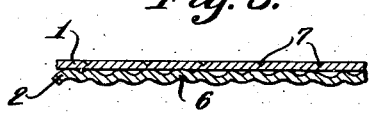
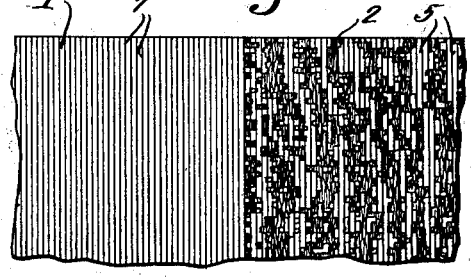
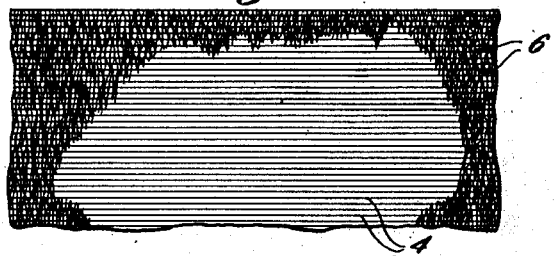
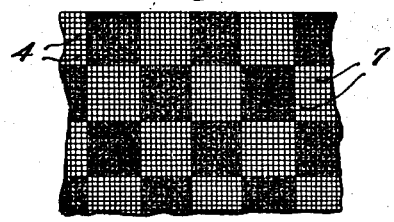
Inventor,
Benjamin Asnes,
by Roberts, Cushman & Woodbury.
Attys.

Nov. 12, 1935.  B. ASNES  2,020,928
LAMINATED SHEET MATERIAL
Filed Oct. 20, 1934   2 Sheets-Sheet 2
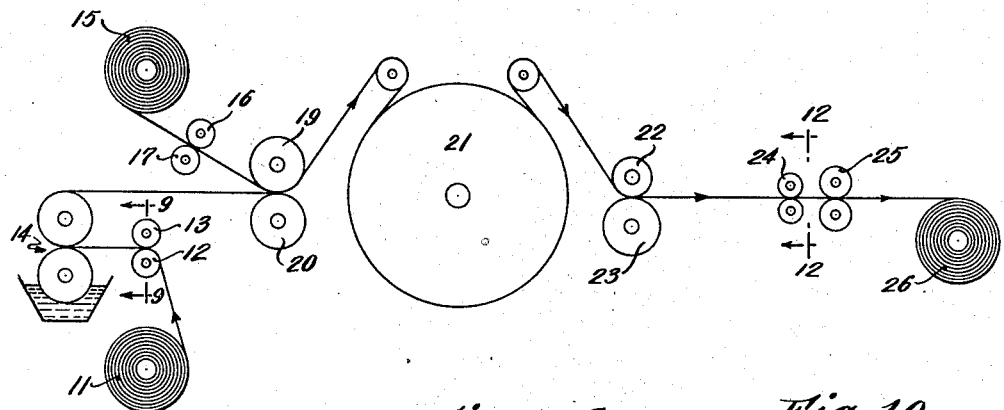
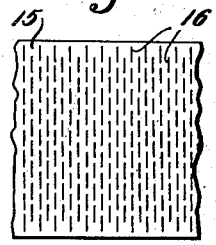
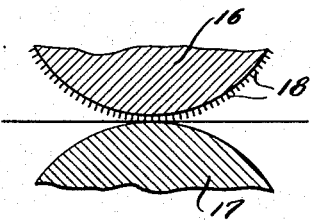
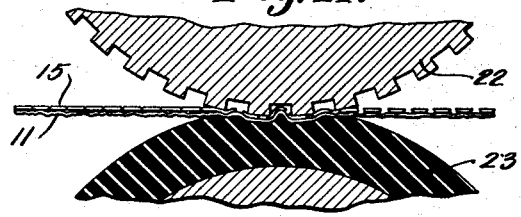
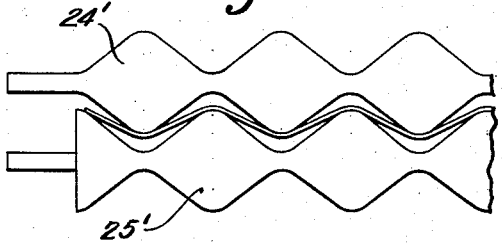
Inventor,
Benjamin Asnes,
by Roberts, Cushman & Woodberry.
Attys.

Patented Nov. 12, 1935

2,020,928

UNITED STATES PATENT OFFICE 2,020,928

LAMINATED SHEET MATERIAL

Benjamin Asnes, Framingham, Mass., assignor to Dennison Manufacturing Company, Framingham, Mass., a corporation of Massachusetts Application October 20, 1934, Serial No. 749,252

23 Claims. (Cl. 154—33)

This invention relates to the art of creped (plaited or corrugated or wrinkled) sheet material, particularly creped paper of the kind adapted for decorative purposes, the principal object being to produce novel effects in appearance and a greater range of decorative effects in use. In a specific aspect an object is to provide material resembling fabrics in softness, pliability, self-draping quality, as well as in appearance.

According to this invention a strip of paper, cloth, regenerated cellulose or other suitable material is transversely creped to permit stretching, and is then adhesively united to another sheet of paper, foil, regenerated cellulose or other suitable material which is creped to less extent or is creped longitudinally or preferably which is uncreped. While the cement may be of any suitable type it is preferably of the ordinary gum type which hardens by drying. In any event it is largely if not entirely confined to the crests of the crinkles in said first sheet so that the two sheets are not bonded together along the valleys between crinkles. Convenient ways of securing this kind of union between the sheets are either, first, to apply the cement (or glue) uniformly over one side of the uncreped sheet or, secondly, to apply the cement to the crests of the crinkles by a roller dipping in liquid cement. In either case when the two sheets are pressed together by rollers or other suitable means, the pressure should be light enough not to iron out the crinkles.

When the united sheets are stretched longitudinally the transversely creped sheet yields because of its crinkles and the other sheet, being relatively unyielding, tends to separate, along lines opposite the uncemented valleys of the creped sheet, into strips or other formations, either of predetermined or haphazard designs and, of course, still adhering thereto. Inasmuch as the crinkles of creped paper do not extend regularly and continuously throughout the width of the paper, the aforesaid narrow strips are likewise irregular and more or less discontinuous. Inasmuch as the uncreped sheet is subjected to substantially all the tension, it will tear in preference to the creped sheet even though it be stronger than the creped sheet; but for most purposes the creped sheet is preferably as strong or stronger than the uncreped sheet. For example, both sheets may be made of the same weight as ordinary tissue paper of loose open formation or the creped sheet may be made of heavier stock and/or different composition.

The tendency of the uncreped sheet to tear as aforesaid may be accentuated by weakening it along juxtaposed transverse lines, diagonal lines, or other design patterns comprising lines, dashes, perforations, curves or stipples before it is united to the creped sheet, as for example by rolling it with a roll having suitable corrugations against another roll having corrugations or designs complementary to those on the first roll or having a smooth surface which may be either hard or soft, or by weakening it after it is united to the creped sheet, as by passing the laminated sheet, while under tension, over a similar roll, with the uncreped side next to the roll.

The uncreped sheet may be divided into the aforesaid strip or design formations either by hand or by machine and either during the process of manufacture or thereafter. However, this is preferably effected by continuously feeding the sheets from the roll at which they are united (through an intermediate dryer if necessary) to a corrugated roll such as above described, with the uncreped sheet next to the corrugated roll, and then feeding the laminated sheet from the corrugated roll at a slightly greater speed, thereby to subject the sheet to tension beyond the corrugated roll. Thus the paper is not only weakened by the edges of the roll corrugations but it may be torn more or less depending upon the tension on the sheet. By using a roll with very sharp edges the uncreped sheet may be cut without tearing and without widening the cut slits. After the uncreped sheet is thus weakened (torn or cut) the openings between the aforesaid strips may be widened by further stretching the paper by hand when put to use.

One sheet may be weakened in both dimensions and the other sheet creped in both dimensions, whereby when the laminated material is stretched in either dimension the weakened sheet separates along lines extending in the other dimension.

By using sheets of different colors a unique effect is produced by one sheet showing through the openings in the torn (or cut) sheet, the proportion of colors depending upon the extent to which the openings in the torn sheet are widened by stretching the material. Still further variations may be secured by printing different patterns on the outer face of the uncreped sheet before it is stretched; and/or coating the outer face with paint, lacquer or other material giving a metallic luster or silk-like sheen; and/or printing, coating or otherwise decorating the transversely creped sheet so that when the top sheet is separated as aforesaid the decorations show through.

In addition to the foregoing treatment either one or both sheets may be corrugated longitudinally or embossed either before or after they are secured together, thereby affording a further variation in the decorative and softening effect available.

For the purpose of illustration typical embodiments of the invention are shown in the accompanying drawings, in which Fig. 1 is a perspective view of a creped and uncreped sheet before they are joined together;

Fig. 2 is a longitudinal sectional view of the two sheets after they are cemented together;

Fig. 3 is a similar section after the uncreped sheet has been weakened along transverse lines as aforesaid;

Fig. 4 is a similar section after the creped sheet has been stretched and the uncreped sheet divided into strips;

Fig. 5 is a front face view of a laminated sheet, the left-hand end of which is unstretched as in Figs. 2 and 3 and the right-hand end of which is stretched as in Fig. 4;

Fig. 6 is a rear face view showing the aforesaid longitudinal corrugations;

Fig. 7 is a front face view of a laminated product after the top sheet has been printed with a checkerboard pattern, weakened along transverse (vertical) lines and corrugated along longitudinal (horizontal) lines;

Fig. 8 is a diagrammatic view of one method of manufacture;

Fig. 9 is a sectional view of rolls for longitudinally corrugating one sheet;

Fig. 10 is a sectional view of rolls for weakening one sheet along transverse lines;

Fig. 10a is a plan view of a sheet weakened by the rolls of Fig. 10;

Fig. 11 is a sectional view of rolls for rupturing the weakened sheet; and

Fig. 12 is a side elevation of modified stretching rolls.

The particular embodiment of the invention shown in Figs. 1 to 5 comprises an uncreped sheet 1 and a creped sheet 2 cemented together along the crests 3 of the crinkles 6 of the creped sheet, the uncreped sheet being weakened along the transverse lines 7. Fig. 5 illustrates the appearance of the front or upper side of the laminated sheet both before and after it has been stretched longitudinally, the left-hand end being unstretched and the right-hand end stretched to tear the upper uncreped sheet into the transverse strips 5. Fig. 6 illustrates a laminated product in which the rear sheet is not only creped to produce the transverse crinkles 6 but is also corrugated along the longitudinal lines 4. Fig. 7 represents a product in which the front sheet is weakened along the transverse lines 7 as in Fig. 3 and is also corrugated along the longitudinal lines 4.

Referring to Fig. 8 which illustrates a preferred method of manufacture, 11 is a supply roll of creped material, 12 and 13 are rolls having circumferential serrations for longitudinally corrugating the creped material 11, 14 is cement applying means of usual type, 15 is another supply roll of sheet material, 16 and 17 are rolls for weakening the sheet 15 along the transverse lines 18 (Fig. 10a), the roll 16 having discontinuous longitudinal ridges 18 which either cut the sheet all the way through or weaken the sheet enough to tear easily, 19 and 20 are rolls for pressing the two sheets together, 21 is a drying cylinder, 22 and 23 are processing rolls for rupturing the weakened sheet by slightly stretching both sheets, the united sheets held taut as they pass between these two rolls, 24 and 25 are two pairs of spaced feed rolls, the second pair being driven faster than the first pair so that the material between the two pairs is stretched to widen the openings in the upper sheet, and 26 is a take-up roll. As shown at 24'—25' in Fig. 12, one or both of the pairs of rolls 24 and 25 may be corrugated circumferentially so that the material is stretched not only longitudinally (as above explained) but also transversely.

As shown in Fig. 11 the roll 12 may have longitudinal corrugations and the roll 23 may have a rubber facing soft enough to be indented by the corrugations on roll 22.

It should be understood that the present disclosure is for the purpose of illustration only and that this invention includes all modifications and equivalents which fall within the scope of the appended claims.

I claim:

1. Laminated material comprising a plurality of sheets adhesively united, one sheet being more wavy than the other so that when the material is stretched crosswise of the waves the other sheet will tear along lines extending transversely of the direction of stretching.

2. Laminated material comprising a plurality of sheets adhesively united, one sheet being creped transversely and another sheet being weakened along lines extending transversely so that it may be torn along said lines by stretching the material longitudinally.

3. Laminated material comprising a plurality of sheets adhesively united, one sheet being creped transversely and another sheet having elongate openings extending transversely whereby the openings may be widened by stretching the fabric longitudinally.

4. A paper product comprising united layers of paper of different colors, one layer being creped transversely and another layer being weakened along lines extending transversely so that it may be torn along said lines by stretching the layers longitudinally.

5. A paper product comprising united layers of paper of different colors, one layer being creped transversely and another layer having elongate openings extending transversely whereby the openings may be widened to expose the creped layer therethrough by stretching the layers longitudinally.

6. Laminated material comprising a plurality of sheets adhesively united, one sheet being creped transversely and another sheet being weakened along lines extending transversely so that it may be torn along said lines by stretching the material longitudinally, both sheets being corrugated longitudinally.

7. Laminated material comprising a plurality of sheets adhesively united, one sheet being creped transversely and another sheet having elongate openings extending transversely whereby the openings may be widened by stretching the material longitudinally, both sheets being corrugated longitudinally.

8. A paper product comprising united layers of paper of different colors, one layer being creped transversely and another layer being weakened along lines extending transversely so that it may be torn along said lines by stretching the layers longitudinally, both sheets being corrugated longitudinally.

9. A paper product comprising united layers of paper of different colors, one layer being creped transversely and another layer having elongate openings extending transversely whereby the openings may be widened to expose the creped layer therethrough by stretching the layers longitudinally, both sheets being corrugated longitudinally.

10. The method of making laminated material which comprises transversely creping one sheet, adhesively uniting it with another sheet having weakened lines extending transversely, and stretching the material longitudinally to tear the weakened sheet along said lines.

11. The method of making laminated material which comprises transversely creping one sheet, adhesively uniting it with another sheet having elongate openings extending transversely, and then stretching the material longitudinally to widen said openings.

12. The method of making laminated material which comprises transversely creping one sheet, adhesively uniting it with an uncreped sheet, weakening the uncreped sheet along transverse lines and stretching the material longitudinally to tear the weakened sheet along said lines.

13. The method of making laminated material which comprises transversely creping one sheet, adhesively uniting it with an uncreped sheet, forming elongate openings in the uncreped sheet transversely thereof and stretching the material longitudinally to widen said openings.

14. The method of making laminated material which comprises transversely creping one sheet, adhesively uniting it with another sheet having weakened lines extending transversely, and corrugating both sheets longitudinally.

15. The method of making laminated material which comprises transversely creping one sheet, adhesively uniting it with another sheet having elongate openings extending transversely, and corrugating both sheets longitudinally.

16. The method of making laminated material which comprises transversely creping one sheet, adhesively uniting it with an uncreped sheet, weakening the uncreped sheet along transverse lines and corrugating both sheets longitudinally.

17. The method of making laminated material which comprises transversely creping one sheet, adhesively uniting it with an uncreped sheet, forming elongate openings in the uncreped sheet transversely thereof and stretching the material longitudinally to widen said openings, and corrugating both sheets longitudinally.

18. The method of making laminated material which comprises transversely creping one sheet, longitudinally creping another sheet, uniting the sheets in superposed relationship, and stretching the united sheets both transversely and longitudinally.

19. Laminated material comprising united sheets creped transversely and longitudinally respectively, the material being stretched in both dimensions to separate each sheet along lines extending transversely of its creping.

20. Laminated material comprising united sheets creped transversely and longitudinally respectively, whereby when the material is stretched in either dimension one sheet will separate along lines extending transversely of its creping.

21. The method of making laminated material which comprises creping a sheet both transversely and longitudinally, weakening another sheet in both dimensions, uniting the sheets in superposed relationship, and stretching the material in both dimensions to separate the weakened sheet along lines extending both transversely and longitudinally.

22. Laminated material comprising a sheet creped both transversely and longitudinally, and another sheet weakened in both dimensions, the sheets being united in superposed relationship, whereby when the material is stretched in either dimension the weakened sheet separates along lines extending in the other dimension.

23. Laminated material comprising superposed sheets united together, one sheet being creped in one dimension and the other sheet being weakened along lines extending in the same dimension, whereby when the material is stretched in the other dimension the weakened sheet separates along said lines.

BENJAMIN ASNES.